US012735366B2

(12) United States Patent
Briand et al.

(10) Patent No.: US 12,735,366 B2
(45) Date of Patent: Sep. 15, 2026

(54) USE OF POLYAMINES, TYRAMINE AND/OR A PLANT EXTRACT CONTAINING SAME TO STABILISE MICROORGANISMS

(71) Applicant: AGRO INNOVATION INTERNATIONAL, Saint-Malo (FR)

(72) Inventors: Xavier Briand, Lezardrieux (FR); Fabrice Houdusse, Saint-Malo (FR); Morgane Comby, Saint-Malo (FR); Matthieu C. Beziat, Saint-Jouan-des-Guerets (FR)

(73) Assignee: AGRO INNOVATION INTERNATIONAL, Saint-Malo (FR)

( * ) Notice: Subject to any disclaimer, the term of this patent is extended or adjusted under 35 U.S.C. 154(b) by 805 days.

(21) Appl. No.: 17/926,506

(22) PCT Filed: May 18, 2021

(86) PCT No.: PCT/FR2021/050855

§ 371 (c)(1),
(2) Date: Nov. 18, 2022

(87) PCT Pub. No.: WO2021/234262

PCT Pub. Date: Nov. 25, 2021

(65) Prior Publication Data

US 2023/0234897 A1 Jul. 27, 2023

(30) Foreign Application Priority Data

May 19, 2020 (FR) ....................................... 2005016

(51) Int. Cl.
*C05F 11/02* (2006.01)
*C05F 5/00* (2006.01)

(52) U.S. Cl.
CPC .............. *C05F 11/02* (2013.01); *C05F 5/004* (2013.01)

(58) Field of Classification Search
CPC ................................. C05F 11/02; C05F 5/004
See application file for complete search history.

(56) References Cited

FOREIGN PATENT DOCUMENTS

| | | | | |
|---|---|---|---|---|
| CN | 110092672 A * | 8/2019 | ............... | C05B 7/00 |
| DE | 102005056858 A1 * | 3/2007 | ............... | C12N 1/00 |
| JP | 2015030688 A | 2/2015 | | |
| WO | 2018/182555 A2 | 10/2018 | | |
| WO | 2018/182555 A3 | 10/2018 | | |

OTHER PUBLICATIONS

International Search Report and Written Opinion for PCT/FR2021/050855. mailed Sep. 21, 2021, 14 pages.

In-Hye Kang et al., "Cadaverine is Transported into Vibrio vulnijicus Through its CadB in Alkaline Environment" J Microbial. Biotechnol., vol. 19, No. 10, 2009, (pp. 1122-1126).

Alexander G. Tkachenko et al., "Polyamines reduce oxidative stress in *Escherichia coli* cells exposed to bactericidal antibiotics", Research in Microbiology, vol. 163, 2012 (pp. 83-91).

H. J. Rhee et al., Physiological polyamines: simple primordial stress molecules. Journal of Cellular and Molecular Medicine, vol. 11, No. 4, Jul. 2007, (pp. 685-703).

Manas K. Chattopadhyay, "Polyamines protect *Escherichia coli* cells from the toxic effect of oxygen", PNAS, vol. 100, No. 5, (pp. 2261-2265), (Mar. 4, 2003).

Marta Perez et al., "Tyramine biosynthesis is transcriptionally induced at low,pH and improves the fitness of Enterococcus faecalis in acidic environments", Appl. Microbiol Biotecnolol. vol. 99, 2015 (pp. 3547-3558).

Dhriti Battacharyya, et al., "Seaweed extracts as biostimulants in horticulture", Scientia Horticulturae, Amsterdam, NL, Sep. 1, 2015, (pp. 1-9).

Nuno C. Afonso et al., "Brown Macroalgae as Valuable Food Ingredients" Antioxidants, MDPI, vol. 8, No. 9, 365, Sep. 2, 2019, (pp. 1-26).

Koei Hamana et al. "Polyamine analysis of brown-algal seaweeds (class Phaenophyceae) from food markets" Microb. Resour. Syst. 33(1): 2017, (pp. 3-8).

International Search Report and Written Opinion for Application No. 2005016, mailed Jan. 13, 2021, (4 pp.).

* cited by examiner

*Primary Examiner* — Wayne A Langel
(74) *Attorney, Agent, or Firm* — ROTHWELL, FIGG, ERNST & MANBECK, P.C.

(57) ABSTRACT

The invention relates to the use of polyamines, tyramine and/or a plant extract containing same to stabilise microorganisms under an environmental stress, such as oxidative stress, osmotic stress or salt stress, heat stress, acid/base stress and/or stress linked to competitor microorganisms; and a composition comprising (a) polyamines, tyramine and/or a plant extract containing same, and (b) microorganisms.

19 Claims, No Drawings

USE OF POLYAMINES, TYRAMINE AND/OR A PLANT EXTRACT CONTAINING SAME TO STABILISE MICROORGANISMS

CROSS REFERENCE TO RELATED APPLICATIONS

This application is a 35 U.S.C. § 371 National Stage of International Patent Application No. PCT/FR2021/050855 filed May 18, 2021, designating the United States, which claims priority to and the benefit of French Patent Application No. 2005016 filed May 19, 2020, the entire contents of which are incorporated herein by reference.

TECHNICAL FIELD

The invention concerns the use of an algae and/or plant extract, said extract containing polyamines and/or tyramine, in order to stabilise microorganisms under environmental stress.

PRIOR ART

In the field of agriculture, soils are dynamic systems which contain a large variety of microorganisms. However, many factors, such as the agricultural techniques used in recent decades, as well as climate change, have upset all the pre-existing balances. Thus, the use of large quantities of chemical inputs, cultivation work, etc. have led to a rarefaction, or even elimination of certain microorganisms from the majority of cultivated soils, which contributes to a loss of soil productivity.

Likewise, in the field of animal feed, in order to exert their effects, microorganisms contained in probiotics must remain functional until they reach their site of action. However, these microorganisms are fragile because they are very sensitive to environmental stresses, for example variations in pH. In the case of silage, namely the preservation of fodder by lactic fermentation, microorganisms are also subject to a certain number of environmental stresses such as oxidative stress, osmotic or salt stress, thermal stress, acid or base stress and/or stress linked to competitor microorganisms. The microorganisms used in animal feed are therefore exposed to the same types of stress as those encountered in the field of agriculture, which prevents their growth and stability and/or alters their effects.

The low survival rate of microorganisms in the preparations or after their incorporation in the soil constitutes one of the major limiting factors of their effectiveness. It is therefore necessary to stabilise the microorganisms under environmental stress.

There is therefore a need to find new strategies for stabilising microorganisms under an environmental stress.

It is in this context, the applicant has determined, and this constitutes the basis of the present invention, that the use of polyamines, tyramine and/or a plant extract containing same can stabilise microorganisms under an environmental stress, such as oxidative stress, osmotic stress or salt stress, thermal stress, acid or base stress and/or a stress linked to competitor microorganisms.

SUMMARY OF THE INVENTION

Hence, the present invention, which is applicable in the agro-ecological field and agriculture, aims to propose the use of polyamines, tyramine and/or a plant extract containing same, in order to stabilise microorganisms under an environmental stress, such as oxidative stress, osmotic stress or salt stress, thermal stress, acid or base stress and/or a stress linked to competitor microorganisms.

According to a first aspect, the invention relates to the use of an algae and/or plant extract, said extract containing polyamines and/or tyramine, in order to stabilise microorganisms under an environmental stress.

According to a second aspect, the invention relates to a composition comprising:

(a) an algae and/or plant extract, said extract containing polyamines and/or tyramine, and (b) microorganisms chosen from: (i) atmospheric nitrogen fixing bacteria, such as *Azotobacter* or *Azospirillum*, (ii) plant growth promoting Rhizobacteria (PGPR), (iii) phosphorus-solubilising bacteria such as *Bacillus amyloliquefaciens*, (iv) root phytoprotectant bacteria (PGPR) capable of opposing the activity of pathogens such as *Bacillus subtilis* or *Pseudomonas* spp., (v) phytohormone producing bacteria such as *Bacillus amyloliquefaciens* or *Bacillus radicola*, (vi) bacteria involved in the process of mineralisation of organic matter such as *Lactobacillus rhamnosus* or *Lactobacillus faciminis*, (vii) iron-solubilising bacteria such as *Pseudomonas* spp., (viii) silica-solubilising bacteria, (ix) sulfur-oxidising bacteria, (x) lactic acid bacteria such as *Lactobacillus* spp., *Lactococcus* spp., *Bifidobacterium* spp., (xi) bacteria of the genus *Enterococcus* spp., (xii) bacteria of the genus *Pediococcus* spp., (xiii) bacteria of the genus *Bacillus licheniformis*, (xiv) mycorrhizal fungi such as *Rhizophagus irregularis*, (xv) yeasts of the genus *Saccharomyces cerevisiae*, and (xvi) a mixture of at least two microorganisms chosen from (i) to (xv).

According to a third aspect, the invention relates to a method for fertilising a plant, characterised in that it comprises the application, to said plant, of a composition according to the invention.

DETAILED DESCRIPTION

Definitions

The term "tyramine" designates a monoamine chemical compound, with CAS number 51-67-2. Tyramine has the following formula:

Formula 1

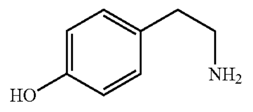

The term "polyamines" designates organic compounds containing at least two amine functions. Polyamines are present in almost all plants, animals and microorganisms. Polyamines are involved in a variety of cellular processes, such as expression of certain genes, cell growth, cell survival and cell proliferation. In the context of the present invention, the polyamines can be chosen from cadaverine, spermidine, spermine and/or putrescine. The plant extract used in the context of the invention can therefore include one, two, three or four polyamines chosen from cadaverine, spermidine, spermine and putrescine.

Cadaverine (or pentamethylenediamine), with CAS number 462-94-2, has the following formula:

Formula 2

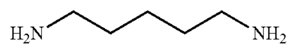

Spermidine (or 1,5,10-triazadecane), with CAS number 124-20-9, has the following formula:

Formula 3

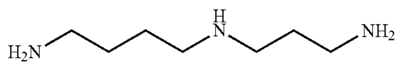

Spermine (also called gerontine, musculamine or neuridine), with the CAS number 71-44-3, has the following formula:

Formula 4

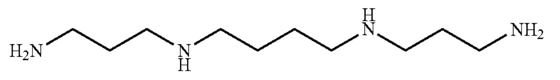

Putrescine (or tetramethylenediamine), with the CAS number 110-60-1, has the following formula:

Formula 5

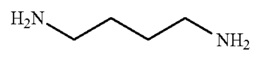

The term "plant extract" designates the product resulting from an extraction of the content of plant cells. In the context of the present invention, the plant extract contains an effective quantity of polyamines and/or tyramine. In the context of the present description, the plant extract can be an algae and/or plant extract.

The term "algae and/or plant extract" designates the product resulting from an extraction of the contents of algae and/or plant cells respectively. In the context of the present invention, the algae extract can be a brown algae extract, such as an extract of brown algae of the Fucaceae family. For example, the brown algae extract may be an extract of *Fucus vesiculosus* or of *Ascophyllum nodosum*. In the context of the present invention, the plant extract may be an extract of beet molasses vinasse.

The preparation of a plant extract containing an effective quantity of polyamines and/or tyramine does not present any particular difficulty; many extraction methods are described in the literature. The extraction method is not limited to one particular method, and conventional methods can be used in order to prepare such an extract. For example, it can be obtained by a method comprising the following steps: washing, grinding, extraction with a solvent (e.g. water), solid/liquid separation and optionally fractionation and/or concentration. The resulting plant extract can be more or less concentrated depending on the intended use, for example it is possible to concentrate the extract by an evaporation technique. A total dehydration of this extract enabling presentation in the form of a water-soluble powder can be obtained, for example, by means of a drum dryer or by spray drying. The extraction conditions and the nature of the plant will be chosen so that the extract obtained has the desired quantity of polyamines and/or tyramine for the intended application According to a particular example, when the extract is an extract of beet molasses vinasse, it can be obtained by a method comprising the following steps: washing the beet, grinding the beet, extraction of the crystallisable sugar from the beet, obtaining of two co-products: the molasses and the pulp of the beet, recovery of the molasses, fermentation of the molasses in order to obtain a beet molasses vinasse, and concentration [2] [3]. It is also possible to enrich the plant extract in polyamines and/or tyramine, for example by an ultrafiltration technique.

The term "effective quantity of polyamines and/or tyramine" designates the quantity of polyamines and/or tyramine that is sufficient in order to stabilise the microorganisms under environmental stress. The plant extract preferably contains at least 0.01% by mass of polyamines and/or tyramine relative to the total dry mass of the extract (% wt/wt), for example at least 0.05% wt/wt, at least 0.5% wt/wt, at least 0.2% wt/wt, for example between 0.01% wt/wt and 1% wt/wt, between 0.05% wt/wt and 0.5% wt/wt. The assay of the quantity of polyamines and tyramines in the extract does not present any particular difficulty since assay methods are described in the literature, such as the HPLC method [1], for example. The plant extract can be more or less concentrated in polyamines and/or tyramine depending on the intended use.

The term "microorganisms" designates microscopic organisms such as bacteria, microscopic fungi, for example microscopic filamentary fungi, and yeasts. The term "spp." means "a plurality of species", from the Latin species plurimae. In the context of the present invention, the microorganisms can be chosen from (i) atmospheric nitrogen fixing bacteria, such as *Azotobacter* or *Azospirillum*, (ii) plant growth promoting Rhizobacteria (PGPR), (iii) phosphorus-solubilising bacteria such as *Bacillus amyloliquefaciens*, (iv) root phytoprotectant bacteria (PGPR) capable of opposing the activity of pathogens such as *Bacillus subtilis* or *Pseudomonas* spp., (v) phytohormone producing bacteria such as *Bacillus amyloliquefaciens* or *Bacillus radicola*, (vi) bacteria involved in the process of mineralisation of organic matter such as *Lactobacillus rhamnosus* or *Lactobacillus faciminis*, (vii) iron-solubilising bacteria such as *Pseudomonas* spp., (viii) silica-solubilising bacteria, (ix) sulfur-oxidising bacteria, (x) lactic acid bacteria such as *Lactobacillus* spp., *Lactococcus* spp., *Bifidobacterium* spp., (xi) bacteria of the genus *Enterococcus* spp., (xii) bacteria of the genus *Pediococcus* spp., (xiii) bacteria of the genus *Bacillus licheniformis*, (xiv) mycorrhizal fungi such as *Rhizophagus irregularis*, (xv) yeasts of the genus *Saccharomyces cerevisiae*, and (xvi) a mixture of at least two microorganisms chosen from (i) to (xv).

The term "composition" designates a mixture of one or more substances that are distinct from one another. In the context of the invention, a composition can be a fertilising composition, a composition intended for animal feed or a composition intended for silage preservation.

A "fertilising composition" designates a composition comprising a fertilising substance, or a mixture of fertilising substances, that are natural or synthetic origin, used in agriculture, horticulture and sylviculture.

The term "fertilising substance" means a fertiliser and/or a soil amendment.

The term "fertiliser" designates fertilising substances, the function of which is to apply elements to plants that are directly useful for their nutrition (major fertilising elements, secondary fertilising elements and trace elements).

The term "soil amendment" designates a substance intended to improve the quality of soils, and in particular intended to improve the pH of soils. Advantageously, the soil amendment is chosen from base mineral soil amendments of the limestone and/or limestone and magnesium types; humus soil amendments of the compost or manure type.

Within the meaning of the invention, a "composition intended for animal feed" can comprise substances intended to improve the performance and/or health of animals. A composition intended for animal feed can, for example, comprise probiotic foods, mineral/vitamin supplements, etc.

Within the meaning of the invention, a "composition intended for the preservation of silage" may comprise substances intended to improve the preservation and quality of silages. A composition intended for the preservation of silage may, for example, comprise lactose, xylanase or beta-glucanase enzymes, etc.

In the present application, the term "plant" means the plant considered as a whole, including its root system, its vegetative system, seeds and fruits.

The present invention arises from the surprising advantages determined by the inventors of the effect of polyamines, tyramine and/or a plant extract containing same for stabilising microorganisms.

Use

The present application relates to the use of polyamines, tyramine and/or a plant extract containing same, in order to stabilise microorganisms under an environmental stress, such as oxidative stress, osmotic stress or salt stress, thermal stress, acid or base stress and/or a stress linked to competitor microorganisms.

The first object of the invention relates to the use of an algae and/or plant extract, said extract containing polyamines and/or tyramine, in order to stabilise microorganisms under an environmental stress, such as oxidative stress, osmotic stress or salt stress, thermal stress, acid or base stress and/or a stress linked to competitor microorganisms. In particular, the plant extract contains an effective quantity of polyamines and/or tyramine. The plant extract is preferably a brown algae extract, for example an extract of brown algae of the Fucaceae family, and/or an extract of beet molasses vinasse. It is understood that the plant used for the preparation of the plant extract naturally comprises polyamines and/or tyramine. Consequently, the polyamines and/or tyramine contained in the algae and/or plant extract come directly from the algae and/or plants used to prepare said extract.

An oxidative stress corresponds to an attack on the microorganisms by free radicals, also called "reactive oxygen species" (ROS).

An acid or base stress corresponds to a stress related to the pH. Indeed, it is known that microorganisms are more or less stable at certain pH, for example a pH ranging from 1 to 12, for example ranging from 3 to 9, for example a pH of 5 or, for example, a pH of 9.

An osmotic stress corresponds to a stress-related to the osmolarity, i.e. the salt content in medium. Indeed, it is known that microorganisms are more or less stable at certain osmolarities, for example microorganisms are generally less stable at a salt concentration greater than 0.3 M.

Moisture stress corresponds to a stress-related to the absence of water, i.e. to the water content in the medium.

Thermal stress corresponds to a stress induced by cold or heat. The temperature inducing a thermal stress varies according to the microorganism considered.

A stress linked to competitor microorganisms corresponds to a stress related to the presence of microorganisms other than the microorganisms stabilised with the plant extract. This may concern, for example, microorganisms that are naturally present in the soil which compete with the species in the soil and compete for access to nutrients with the microorganisms added to the soil. For example, competitor microorganisms are bacteria of the genera *Agrobacterium* spp., *Erwinia* spp., or *Xanthomonas* spp., or fungi of the genus *Fusarium* spp.

In particular, the stabilisation consists in increasing the survival rate of the microorganisms, in particular measured after 24 hours, 48 hours or 72 hours growth, under environmental stress conditions relative to the same conditions without polyamines, tyramine and/or plant extract containing same. The survival rate of microorganisms with polyamines, tyramine and/or the plant extract containing same, and subject to an environmental stress, is advantageously at least 1 log, at least 2 log, at least 3 log, at least 4 log, at least 5 log greater than survival rate of the same microorganisms subjected to the same environmental stress but without polyamines, tyramine and/or plant extract containing same. The survival rate is measured by comparing the quantity of bacteria (for example in CFU) after a given time, for example 24 hours, 48 hours or 72 hours.

Advantageously, the microorganisms are contained in a composition, such as a fertilising composition, a composition intended for animal feed or a composition intended for the preservation of silage. The microorganisms can be contained in said composition in a quantity ranging from $10^2$ to $10^{50}$ CFU per tonne of composition, preferably ranging from $10^5$ to $10^{20}$ CFU per tonne of composition, preferably approximately $10^{11}$ CFU per tonne of composition.

The polyamines, tyramine and/or the plant extract containing same can therefore be used as a supplement in a composition, for example a fertilising composition, a composition intended for animal feed or a composition intended for silage preservation, in order to stabilise the microorganisms contained in these compositions.

Composition

The present application relates to a composition comprising: (a) polyamines, tyramine and/or a plant extract containing same, and (b) microorganisms chosen from: (i) atmospheric nitrogen fixing bacteria, such as *Azotobacter* or *Azospirillum*, (ii) plant growth promoting Rhizobacteria (PGPR), (iii) phosphorus-solubilising bacteria such as *Bacillus amyloliquefaciens*, (iv) root phytoprotectant bacteria (PGPR) capable of opposing the activity of pathogens such as *Bacillus subtilis* or *Pseudomonas* spp., (v) phytohormone producing bacteria such as *Bacillus amyloliquefaciens* or *Bacillus radicola*, (vi) bacteria involved in the process of mineralisation of organic matter such as *Lactobacillus rhamnosus* or *Lactobacillus faciminis*, (vii) iron-solubilising bacteria such as *Pseudomonas* spp., (viii) silica-solubilising bacteria, (ix) sulfur-oxidising bacteria, (x) lactic acid bacteria such as *Lactobacillus* spp., *Lactococcus* spp., *Bifidobacterium* spp., (xi) bacteria of the genus *Enterococcus* spp., (xii) bacteria of the genus *Pediococcus* spp., (xiii) bacteria of the genus *Bacillus licheniformis*, (xiv) mycorrhizal fungi such as *Rhizophagus irregularis*, (xv) yeasts of the genus *Saccharomyces cerevisiae*, and (xvi) a mixture of at least two microorganisms chosen from (i) to (xv).

A second object of the invention relates to a composition comprising:

(a) an algae and/or plant extract, said extract containing polyamines and/or tyramine, and (b) microorganisms chosen from: (i) atmospheric nitrogen fixing bacteria, such as *Azotobacter* or *Azospirillum*, (ii) plant growth promoting Rhizobacteria (PGPR), (iii) phosphorus-solubilising bacteria such as *Bacillus amyloliquefaciens*, (iv) root phytoprotectant bacteria (PGPR) capable of opposing the activity of pathogens such as *Bacillus subtilis* or *Pseudomonas* spp., (v) phytohormone producing bacteria such as *Bacillus amyloliquefaciens* or *Bacillus radicola*, (vi) bacteria involved in the process of mineralisation of organic matter such as *Lactobacillus rhamnosus* or *Lactobacillus faciminis*, (vii) iron-solubilising bacteria such as *Pseudomonas* spp., (viii) silica-solubilising bacteria, (ix) sulfur-oxidising bacteria, (x) lactic acid bacteria such as *Lactobacillus* spp., *Lactococcus* spp., *Bifidobacterium* spp., (xi) bacteria of the genus *Enterococcus* spp., (xii) bacteria of the genus *Pediococcus* spp., (xiii) bacteria of the genus *Bacillus licheniformis*, (xiv) mycorrhizal fungi such as *Rhizophagus irregularis*, (xv) yeasts of the genus *Saccharomyces cerevisiae*, and (xvi) a mixture of at least two microorganisms chosen from (i) to (xv).

In particular, (a) is a plant extract containing an effective quantity of polyamines and/or tyramine. Advantageously, the plant extract is an algae and/or plant extract, preferably a brown algae extract, for example an extract of brown algae of the Fucaceae family, and/or a extract of beet molasses vinasse. It is understood that the plant used for the preparation of (a) the plant extract naturally comprises polyamines and/or tyramine. Consequently, the polyamines and/or tyramine contained in (a) the algae and/or plant extract come directly from the algae and/or plants used to prepare said extract.

The composition according to the invention may in particular comprise $10^2$ to $10^{50}$ CFU of microorganisms (b) per tonne of composition, preferably $10^5$ to $10^{20}$ CFU of microorganisms (b) per tonne of composition, preferably $10^{11}$ CFU of microorganisms (b) per tonne of composition.

The composition may comprise, in particular, 0.1 to 100 grams of polyamines and/or tyramine per tonne of composition, preferably 0.4 to 10 grams of polyamines and/or tyramine per tonne of composition.

Thus, in a particular embodiment of the invention, the composition comprises:

0.1 to 100 grams of polyamines and/or tyramine per tonne of composition, preferably 0.4 to 10 grams of polyamines and/or tyramine per tonne of composition, and $10^2$ to $10^{50}$ CFU of microorganisms (b) per tonne of composition, preferably $10^5$ to $10^{20}$ CFU of microorganisms (b) per tonne of composition, preferably $10^{11}$ CFU of microorganisms (b) per tonne of composition.

The composition according to the invention may further comprise (c) a fertiliser and/or a soil amendment.

The fertiliser may be one or more active substances chosen from nitrogen, phosphorus, potassium, urea, ammonium sulfate, ammonium nitrate, phosphate, potassium chloride, ammonium sulfate, magnesium nitrate, manganese nitrate, zinc nitrate, copper nitrate, phosphoric acid, potassium nitrate, boric acid and the mixtures thereof, preferably a mixture of nitrogen, potassium and phosphorus or a mixture of phosphorus and potassium. The soil amendment may be one or more active substances chosen from limestone-type base mineral soil amendments, magnesian-type base mineral soil amendments, compost type humus soil amendments and/or the manure-type humus soil amendments, preferably fertiliser and mineral amendments.

Polyamines, tyramine and/or the plant extract containing same, preferably plant extract (a) containing an effective quantity of polyamines and/or tyramine, for example the algae and/or plant extract (a), preferably the algae and/or plant extract (a) containing an effective quantity of polyamines and/or tyramine, stabilising the microorganisms (b) under an environmental stress, such as oxidative stress, osmotic stress or salt stress, thermal stress, acid or base stress and/or stress linked to competitor microorganisms. Indeed the microorganisms (b) may be sensitive and/or unstable in the presence of a fertiliser, at a pH ranging from 1 to 12, preferably at a pH ranging from 3 to 9, for example at a pH of approximately 5 or at a pH of approximately 9 and/or at a salinity going beyond the salt sensitivity/stability threshold of a considered microorganism, for example at a salt concentration greater than 0.3 M for bacteria of the genus *Azobacter chroococcum.*

In a particular embodiment, the composition further comprises a fertiliser and has a pH ranging from 1 to 12, preferably a pH ranging from 3 to 9, for example a pH of approximately 5 or a pH of approximately 9 and/or a salinity going beyond the salt sensitivity/stability threshold of a considered microorganism, for example at a salt concentration greater than 0.3 M for bacteria of the genus *Azobacter chroococcum.*

The composition according to the invention may be in solid or liquid form, preferably in solid form.

The composition according to the invention may also comprise other substances, such as biostimulants, phytohormones, polyphenols, amino acids, etc.

The composition according to the invention may be a fertilising composition, a composition for animal feed or a composition for silage preservation. The other substances will therefore be chosen according to the intended use.

Examples of fertilising composition according to the invention include compositions comprising limestone soil amendments, organic soil amendments and culture media, NP, PK and NPK-type root fertilisers etc., foliar fertilisers and/or biostimulants or root nutrient solutions.

Examples of compositions according to the invention intended for animal feed include compositions comprising, for example, sodium bicarbonate, magnesium oxide and nutritional yeast.

Examples of compositions according to the invention intended for silage preservation include compositions comprising, for example, lactose, xylanase and beta-glucanase-type enzymes, etc.

Method

A third object of the invention relates to a method for fertilising a plant, characterised in that it comprises the application, to said plant, of a composition according to the invention. The method according to the invention stimulates the growth of a plant and/or stimulates the yield of a plant.

According to the method of the invention, the composition can be applied to said plant in a quantity ranging from 0.5 to 1500 kg/ha, preferably ranging from 1 to 1000 kg/ha.

The composition can be applied in solid or liquid form. According to the method of the invention, the composition can advantageously be a fertilising composition, as described above. Advantageously, the application to said plant will be carried out by the foliage or via the roots, preferably via the roots.

The present invention has application in the treatment of a very large variety of plants. These include, in particular:

- field crops, such as cereals (wheat, maize, sugar cane, etc.),
- protein crops (peas),
- oilseed crops (soya, sunflower),
- vines,
- grazing plants used for animal feed,
- specialised crops such as, in particular, market garden crops (lettuce, spinach, tomato, melon), vines, arboriculture (orange, pear, apple, nectarine trees), or horticulture (rose bushes),
- industrial crops (potato, beets, etc.).

In a preferred embodiment according to the invention, the plant belongs to the order of monocotyledons, preferably to the family of Poaceae, preferably the plant is chosen from wheat, rice, barley, oats, rye, grazing plants, sugar cane or maize.

The present invention is illustrated by the following non-limiting examples.

EXAMPLES

Example 1: Preparation of an Algae and/or Plant Extract

Example 1a): Preparation of an Extract of Brown Algae of the Fucaceae Family of the Genus *Ascophyllum nodosum*

200 g of fresh algae of the genus *Ascophyllum nodosum* were ground in order to obtain fresh algae fragments having a size of approximately 5 mm.

The aqueous extraction of fresh algae was carried out using 200 g of *Ascophyllum nodosum* per litre of water.

The extraction was carried out in a 0.5N solution of sulfuric acid under agitation, which lasted 2 hours at ambient temperature. The extract was then filtered on a membrane (80 μm porosity) then concentrated on a falling film evaporator. The analysis of one kilogram of extract was carried out by high-performance liquid chromatography. The analytical method used for the identification and quantification of polyamines is based on the method described by H. B. Papenfus (2011).

One kilogram of dry extract (table 1) contains 3300 mg polyamines in total, i.e. 480 mg of putrescine, 1470 mg of cadaverine, 840 mg of spermidine and 510 mg of spermine.

TABLE 1

| Compounds | Quantity of polyamines from a liquid extract of *Ascophyllum nodosum* in mg/kg | Quantity of polyamines from a dry extract of *Ascophyllum nodosum* in mg/kg |
|---|---|---|
| Putrescine | 16 | 480 |
| Cadaverine | 49 | 1470 |
| Spermidine | 28 | 840 |
| Spermine | 17 | 510 |
| Total | 110 | 3300 |

Example 1 b): Preparation of an Extract of Brown Algae of the Fucaceae Family of the Genus *Fucus vesiculosus*

200 g of fresh algae of the genus *Fucus vesiculosus* were ground in order to obtain fresh algae fragments having a size of approximately 5 mm.

The aqueous extraction of fresh algae was carried out using 200 g of *Fucus vesiculosus* per litre of water.

The extraction was carried out in a 1N solution of sulfuric acid under agitation, which lasted 2 hours at ambient temperature. The extract was then filtered on a membrane (80 μm porosity) then concentrated on a falling film evaporator. The analysis of one kilogram of extract was carried out by high-performance liquid chromatography. The analytical method used for the identification and quantification of polyamines is based on the method described by H. B. Papenfus (2011).

One kilogram of dry extract (table 2) contains 7170 mg of polyamines in total: 1140 mg of putrescine, 150 mg of cadaverine, 1830 mg of spermidine and 4050 mg of spermine.

TABLE 2

| Compounds | Quantity of polyamines from a liquid extract of *Fucus vesiculosus* in mg/kg | Quantity of polyamines from a dry extract of *Fucus vesiculosus* in mg/kg |
|---|---|---|
| Putrescine | 38 | 1140 |
| Cadaverine | 5 | 150 |
| Spermidine | 61 | 1830 |
| Spermine | 135 | 4050 |
| Total | 239 | 7170 |

Example 1c): Analysis of an Extract of Beet Molasses Vinasse

An extract of beet molasses vinasse suitable for implementation of the invention is available under the following trade names: Proteinal, Sirional, Betainex, Viprotal, Vinasse FS, Citrocol and Prodyn [3].

The analysis of one kilogram of liquid extract (approximately 60% dry mass) was carried out by high performance liquid chromatography. The analytical method used for the identification and quantification of polyamines is based on the method described by H. B. Papenfus (2011) [1].

One kilogram of dry extract (table 3) contains 477 mg of polyamines in total: 344 mg of tyramine, 73 mg of putrescine, 48 mg of cadaverine and 12 mg of spermidine

TABLE 3

| Compounds | Quantity of polyamines from a liquid extract of beet molasses vinasse in mg/kg | Quantity of polyamines and tyramine from a dry extract of beet molasses vinasse in mg/kg |
|---|---|---|
| Tyramine | 202 | 344 |
| Putrescine | 43 | 73 |
| Cadaverine | 28 | 48 |
| Spermidine | 7 | 12 |
| Total | 279 | 477 |

Example 2: Effect of an Algae or Plant Extract on the Growth of Microorganisms The effect of each of the extracts prepared according to example 1a), 1b) or 1c) was studied on the growth of various bacterial strains, under conditions with or without thermal stress, osmotic stress or acid/base stress. The extracts obtained in examples 1a), 1b) or 1c) were added to a culture medium in different quantities, in order to obtain the desired quantities of polyamines and/or tyramine.

The study was carried out in Spizizen Minimal Medium SMM culture broth ($(NH_4)_2SO_4$: 2 g/L, $K_2HPO_4$: 14 g/L, $KH_2PO_4$: 6 g/L, $MgSO_4$: 0.2 g/L, $C_6H_5Na_3O_7 \cdot 2H_2O$: 1 g/L, D-glucose: 5 g/L).

The starting inoculate for each strain was calibrated by OD measurement (620 nm) in order to obtain an initial concentration of approximately $10^3$-$10^4$ CFU/mL. The strains were incubated for 24 to 72 h. Counts were performed in TSA agar (Tryptone Soya Agar) at TO and after 24 h, 48 h or 72 h incubation at 30° C. (+/−1° C.), according to the studied strains.

For each of the strains, the survival rate in the presence of the extract and/or stress was calculated relative to the bacterial concentration obtained at the end of the kinetics (at T=24 h, 48 h or 72 h) in the control mode containing the strain alone, under non-stressed conditions, without adding the extract. Similarly, the survival rate in the presence or absence of the extract and/or stress was calculated relative to the bacterial concentration obtained at the end of the kinetics in the mode containing the strain alone, under stress conditions, without adding the extract.

Example 2a): Effect of the Extract of *Fucus vesiculosus* Prepared According to Example 1a) on the Growth of *Bacillus* sp. Under Osmotic Stress Conditions The strain *Bacillus* sp. was tested under osmotic stress conditions, in other words by adding 0.3 M NaCl to the culture medium at time T=0.

The results presented in table 4 indicate that the addition of the extract of *Fucus vesiculosus* prepared according to example 1a), under non-stressing conditions, stimulated the growth of *Bacillus* sp., increasing the bacterial concentration by 2.8 logs after 24 h incubation. The addition of 0.3 M NaCl to the culture medium made it possible to reproduce the conditions of a salt stress with a loss of 2.2 logs in the bacterial concentration after 24 h incubation relative to the conditions without salt stress. Under salt stress conditions, the addition of the *Fucus vesiculosus* extract enabled an increase of 4.9 logs in the bacterial concentration after 24 h incubation. Overall, the bacterial concentration obtained is similar to that observed in the medium without salt with the addition of the *Fucus vesiculosus* extract, approximately $10^7$ CFU/mL.

TABLE 4

| Conditions | Bacterial concentration at 24 h (CFU/mL | Survival rate relative to the strain under non-stressing conditions without addition of the extract (log) | Survival rate relative to the strain under salt stress conditions, without addition of the extract (log) |
|---|---|---|---|
| *Bacillus* sp. | $3.0 \cdot 10^4$ | / | 2.2 |
| *Bacillus* sp. + 5 mg of polyamines from *Fucus vesiculosus* extract/kg of medium | $1.7 \cdot 10^7$ | 2.8 | 5 |
| *Bacillus* sp. + 0.3M NaCl | $1.7 \cdot 10^2$ | −2.2 | / |
| *Bacillus* sp. + 0.3M NaCl + 5 mg of polyamines from *Fucus vesiculosus* extract/kg of medium | $1.5 \cdot 10^7$ | 2.7 | 4.9 |

Example 2b): Effect of the Extract of *Fucus vesiculosus* Prepared According to Example 1a) on the Growth of *Bacillus licheniformis* Under Acid Stress Conditions The strain *Bacillus licheniformis* was tested under acid stress conditions, in other words by adding HCl to attain a pH of 4.6 in the culture medium at time T=0.

The results are presented in table 5: the incubation of *B. licheniformis*, for 72 h at pH 4.6 made it possible to reproduce the condition of an acid stress with a 3.7 log loss of bacterial concentration after 72 h incubation, relative to the pH 7 condition.

Under acid stress conditions, the addition of the *Fucus vesiculosus* extract enabled an increase of 1.9 logs in the bacterial concentration after 72 h incubation.

TABLE 5

| Conditions | Bacterial concentration at 72 h (CFU/mL) | Survival rate relative to the strain under non-stressing conditions without addition of the extract (log) | Survival rate relative to the strain under acid stress conditions without addition of the extract. (log) |
|---|---|---|---|
| *B. licheniformis* + pH 7 | $2.9 \cdot 10^8$ | / | 3.7 |
| *B. licheniformis* + pH 7 + 0.5 mg of polyamines from a *Fucus vesiculosus* extract/kg of medium | $1.2 \cdot 10^7$ | −1.4 | 2.3 |
| *B. licheniformis* + pH 4.6 | $5.5 \cdot 10^4$ | −3.7 | / |
| B. *licheniformis* + pH 4.6 + 0.5 mg of polyamines from a *Fucus vesiculosus* extract/kg of medium | $4.1 \cdot 10^6$ | −1.8 | 1.9 |

Example 2c): Effect of the Extract of *Ascophyllum nodosum* Prepared According to Example 1a) on the Growth of *Azospirillum brasilense* Under Osmotic Stress Conditions The strain *Azospirillum brasilense* was tested under osmotic stress conditions, in other words by adding 0.4 M NaCl to the culture medium at time T=0.

The results presented in table 6 indicate that the addition of the extract of *Azospirillum nodosum* prepared according to example 1a), under non-stressing conditions, stimulated the growth of *A. brasilense*, increasing the bacterial concentration by 4.6 logs after 72 h incubation.

The addition of 0.4 M NaCl in the culture medium made it possible to attain a limit level of salt stress. Under these conditions, the addition of the extract of *Ascophyllum nodosum* enabled an increase of 1.5 logs in the bacterial concentration after 72 h incubation. The bacterial concentration attained is 2.6 logs greater than that of the control strain alone but remains less than that of the condition without salt with the addition of the *Ascophyllum nodosum* extract.

TABLE 6

| Conditions | Bacterial concentration at 72 h (CFU/mL) | Survival rate relative to the strain under non-stressing conditions without addition of the extract (log) | Survival rate relative to the strain under salt stress conditions, without addition of the extract (log) |
|---|---|---|---|
| *A. brasilense* | $5.8 \cdot 10^2$ | / | −1.1 |
| *A. brasilense* + 10 | $2.1 \cdot 10^7$ | 4.6 | 3.5 |

TABLE 6-continued

| Conditions | Bacterial concentration at 72 h (CFU/mL) | Survival rate relative to the strain under non-stressing conditions without addition of the extract (log) | Survival rate relative to the strain under salt stress conditions, without addition of the extract (log) |
|---|---|---|---|
| g of polyamines from an *Ascophyllum nodosum* extract/kg of medium | | | |
| *A. brasilense* + 0.4M NaCl | $6.6 \cdot 10^3$ | 1.1 | / |
| *A. brasilense* + 0.4M NaCl + 10 g of polyamines from an *Ascophyllum nodosum* extract/kg of medium | $2.2 \cdot 10^5$ | 2.6 | 1.5 |

Example 2d): Effect of the Extract *Ascophyllum nodosum* Prepared According to Example 1a) on the Growth of *Azospirillum brasilense* Under Thermal Stress Conditions The strain *Azospirillum brasilense* was tested under thermal stress conditions, in other words by increasing the temperature of the culture medium from 30° C. to 45° C. at time T=0.

The results presented in table 7 indicate that the addition of the extract of *Azospirillum nodosum* prepared according to example 1a), under non-stressing conditions, slightly stimulated the growth of *A. brasilense*, increasing the bacterial concentration by 0.5 logs after 72 h incubation.

The incubation of *A. brasilense* for 72 h at 45° C. enabled reproduction of the conditions of a thermal stress with a loss of 5.9 logs in the bacterial concentration after 72 h incubation relative to the condition at 30° C. Under these conditions, the addition of the *Ascophyllum nodosum* extract enabled an increase of 5.5 logs in the bacterial concentration after 72 h incubation. Overall, the bacterial concentration attained is similar to that of the control at 30° C., approximately $5 \cdot 10^6$ CFU/mL.

TABLE 7

| Conditions | Bacterial concentration at 72 h (CFU/mL) | Survival rate relative to the strain under non-stressing conditions without addition of the extract (log) | Survival rate relative to the strain under thermal stress conditions without addition of the extract. (log) |
|---|---|---|---|
| *A. brasilense* in a medium at 30° C. (non-stressing condition) | $7.2 \cdot 10^6$ | / | 5.9 |
| *A. brasilense* + 10 g of polyamines from an *Ascophyllum nodosum* extract/kg of medium, in a medium at 30° C. (non-stressing condition) | $2.5 \cdot 10^7$ | 0.5 | 6.4 |
| *A. brasilense* in a medium at 45° C. (thermal stressing condition) | $1.0 \cdot 10^1$ | −5.9 | / |
| *A. brasilense* + 10 g of polyamines from an *Ascophyllum nodosum* extract/kg of medium in a medium at 45° C. (thermal stressing condition) | $3.1 \cdot 10^6$ | −0.4 | 5.5 |

Example 2f): Effect of the Extract of Beet Molasses Vinasse Prepared According to Example 1c) on the Growth of *Azospirillum brasilense* Under Base Stress Conditions The strain *Azospirillum brasilense* was tested under base stress conditions, in other words by adding NaOH to the culture medium at time T=0.

The results presented in table 8 indicate that the addition of the extract of beet molasses vinasse prepared according to example 1c), under non-stressing conditions, slightly stimulated the growth of *A. brasilense*, increasing the bacterial concentration by 0.6 logs after 72 h incubation.

The incubation of *A. brasilense*, for 72 h at pH 10, made it possible to obtain a limit level of base stress. Under these conditions, the addition of the beet molasses vinasse extract enabled an increase of 1.1 logs in the bacterial concentration after 72 h incubation. The bacterial concentration attained is 1.3 log greater than that of the control strain alone at pH 7.

TABLE 8

| Conditions | Bacterial concentration at 72 h (CFU/mL) | Survival rate relative to the strain under non-stressing conditions without addition of the extract (log) | Survival rate relative to the strain under base stress conditions without addition of the extract. (log) |
|---|---|---|---|
| *A. brasilense* at pH = 7 (non-stressing pH condition) | $4.4 \cdot 10^6$ | / | −0.2 |
| *A. brasilense* + 0.5 mg of polyamines and tyramines from a beet molasses vinasse extract/kg of | $1.7 \cdot 10^7$ | 0.6 | 0.4 |

TABLE 8-continued

| Conditions | Bacterial concentration at 72 h (CFU/mL) | Survival rate relative to the strain under non-stressing conditions without addition of the extract (log) | Survival rate relative to the strain under base stress conditions without addition of the extract. (log) |
|---|---|---|---|
| medium at pH = 7 (non-stressing pH condition) | | | |
| *A. brasilense* at pH = 10 (base pH stress condition) | $7.0 \cdot 10^6$ | 0.2 | / |
| *A. brasilense* + 0.5 mg of polyamines and tyramines from a beet molasses vinasse extract/kg of medium at pH = 10 (base pH stress condition) | $8.3 \cdot 10^7$ | 1.3 | 1.1 |

Example 2g) Effect of the Beetroot Molasses Vinasse Extract Prepared According to Example 1c) on the Growth of a Nitrogen-Fixing Rhizobacteria Complex (*Azotobacter diazotrophicus, Paenibacillus azotofixans, Azotobacter chroococcum*) Under Osmotic Stress Conditions The nitrogen-fixing rhizobacteria complex was tested under osmotic stress conditions, in other words by adding 0.8 M of NaCl to the culture medium at time T=0.

The results presented in table 9 indicate that the addition of the extract of beet molasses vinasse prepared according to example 1c), under non-stressing conditions, slightly stimulated the growth of nitrogen-fixing bacteria, increasing the bacterial concentration by 0.5 logs after 48 h incubation.

The addition of 0.8 M NaCl to the culture medium made it possible to reproduce the conditions of a salt stress with a loss of 5.4 logs in the bacterial concentration after 48 h incubation relative to the conditions without salt.

Under salt stress conditions, the addition of the beet molasses vinasse extract enabled an increase of 5.6 logs in the bacterial concentration after 48 h incubation. The bacterial concentration obtained is close to that observed in the medium without salt with the addition of the beet molasses vinasse extract, approximately $10^8$ CFU/mL.

TABLE 9

| Conditions | Bacterial concentration at 48 h (CFU/mL) | Survival rate relative to the strain under non-stressing conditions without addition of the extract (log) | Survival rate relative to the strain under salt stress conditions, without addition of the extract (log) |
|---|---|---|---|
| Rhizobacteria | $5.2 \cdot 10^7$ | / | 5.4 |
| Rhizobacteria + 10 g of polyamines and tyramines from a beet molasses vinasse extract/kg of medium | $1.6 \cdot 10^8$ | 0.5 | 5.9 |
| Rhizobacteria + 0.8M NaCl | $2.1 \cdot 10^2$ | −5.4 | / |
| Rhizobacteria + 0.8M NaCl + 10 g of polyamines and tyramines from a beet molasses vinasse extract/kg of medium | $8.1 \cdot 10^7$ | 0.2 | 5.6 |

Example 2h): Effect of Glycine Betaine in Comparison to the Effect of Polyamines from an Extract of *Ascophyllum nodosum*

The strain *Azotobacter chroococcum* was tested under osmotic stress conditions, in other words by adding 0.3 M NaCl to the culture medium at time T=0.

The glycine betaine, known as an osmoprotectant, was tested in comparison with the *Ascophyllum nodosum* extract prepared according to example 1a).

The results presented in table 10 indicate that the addition of the extract of *Azospirillum nodosum* prepared according to example 1a), under non-stressing conditions, slightly stimulated the growth of the bacteria, increasing the bacterial concentration by 0.2 logs after 72 h incubation.

The addition of 0.3 M NaCl to the culture medium with neither glycine betaine nor extract, induced a loss of 4.8 logs in the bacterial concentration after 72 h incubation, relative to the conditions without salt.

Under salt stress conditions, the addition of the *Ascophyllum nodosum* extract enabled an increase of 2.9 logs in the bacterial concentration after 72 h incubation relative to the stress conditions, while the addition of glycine betaine under stress conditions caused a loss of 0.8 logs in the bacterial concentration after 72 h incubation relative to the stress conditions.

The polyamines stabilise *Azotobacter chroococcum* under an osmotic stress, whereas no stabilisation is observed with glycine betaine under osmotic stress conditions.

TABLE 10

| Conditions | Bacterial concentration at 72 h (CFU/mL) | Survival rate relative to the strain under non-stressing conditions without addition of the extract (log) | Survival rate relative to the strain under salt stress conditions, without addition of the extract (log) |
|---|---|---|---|
| *Azotobacter chroococcum* | $5.6 \cdot 10^7$ | / | 4.8 |
| *Azotobacter chroococcum* + | $8.4 \cdot 10^2$ | −4.8 | / |

TABLE 10-continued

| Conditions | Bacterial concentration at 72 h (CFU/mL) | Survival rate relative to the strain under non-stressing conditions without addition of the extract (log) | Survival rate relative to the strain under salt stress conditions, without addition of the extract (log) |
|---|---|---|---|
| 0.3M NaCl | | | |
| *Azotobacter chroococcum* + glycine betaine | $1.1 \cdot 10^8$ | 0.3 | 5.1 |
| *Azotobacter chroococcum* + 0.3M NaCl + glycine betaine | $1.4 \cdot 10^2$ | −5.6 | −0.8 |
| *Azotobacter chroococcum* + 10 g of polyamines from an *Ascophyllum nodosum* extract/kg of medium | $8.5 \cdot 10^7$ | 0.2 | 5.0 |
| *Azotobacter chroococcum* + 10 g of polyamines from an *Ascophyllum nodosum* extract/kg of medium + 0.3M NaCl | $7.3 \cdot 10^5$ | −1.9 | 2.9 |

Example 3: Effect of a Biofertiliser Composition Based on an Extract of *Ascophyllum nodosum* on the Growth of Tomatoes Grown in the Field The test was carried out on a crop of tomatoes of species *Solanum lycopersicum*. The experimental system comprises procedures with 5 repetitions. The extract of *Ascophyllum nodosum* was incorporated at a level of 1 g/T in a PK (5-30) solution, which was enriched with the strain *Bacillus licheniformis*. The following treatments were applied to the stage 3 leaves of tomato plants:

- a control comprising no fertiliser,
- the PK 5-30 solution, applied at a level of 500 kg/ha,
- the PK 5-30 solution with the strain *Bacillus licheniformis*, applied at a level of 500 kg/ha corresponding to $5 \cdot 10^8$ CFU/ha, or
- the PK 5-30 solution with the strain *Bacillus licheniformis*, and with the extract of *Ascophyllum nodosum*, 500 kg/ha corresponding to $5 \cdot 10^8$ CFU/ha.

The yield was measured in T/ha. The results are presented in table 11.

TABLE 11

| | Control | Control PK 5-30 | PK 5-30 + *B. licheniformis* | PK 5-30 + *B. licheniformis* + *Ascophyllum nodosum* extract |
|---|---|---|---|---|
| Yield (T/ha) | 180.89 | 188.5 | 190.23 | 207.68 |
| Percentage increase in yield relative to the control | — | +4.2% | +5.2% | 14.8% |

The PK 5-30 solution alone improved the yield of tomatoes by 4.2% relative to the control. The PK 5-30+*B. licheniformis* solution slightly improved the yield, i.e. 5.2% relative to the control. By contrast, the use of the extract in combination with the PK 5-30+ bacteria solution improved the yield relative to the control by more than 14.8%. Relative to the PK 5-30 solution alone, the incorporation of the extract increased the yield of tomatoes to nearly 17.5 T/ha, i.e. an increase of 9.2%.

Example 4: Biofertiliser Compositions or Compositions Intended for Animal Feed According to the Invention

Example 4a): Limestone Soil Amendment

TABLE 12

| Ingredients | Quantity of ingredients in kg |
|---|---|
| *Lithothamnium* | QS 1000 kg |
| *Azospirillum brasilense* | $5 \cdot 10^8$ CFU/T |
| Polyamines and/or tyramine (from an algae or beet vinasse extract prepared according to example 1a), 1b) or 1c)) | 0.4 g/T |

TABLE 13

| Ingredients | Quantity of ingredients in kg |
|---|---|
| Calcium carbonate | QS 1000 kg |
| *Bacillus licheniformis* | $5 \cdot 10^8$ CFU/T |
| Polyamines and/or tyramine (from an algae or beet vinasse extract prepared according to example 1a), 1b) or 1c)) | 5 g/T |

TABLE 14

| Ingredients | Quantity of ingredients in kg |
|---|---|
| Gypsum | QS 1000 kg |
| *Bacillus amyloliquefaciens* | $5 \cdot 10^8$ CFU/T |
| Polyamines and/or tyramine (from an algae or beet vinasse extract prepared according to example 1a), 1b) or 1c)) | 10 g/T |

Example 4b): Organic Soil Amendment and Culture Supports

TABLE 15

| Ingredients | Quantity of ingredients in kg |
|---|---|
| Compost | QS 1000 kg |
| Peat | 500 kg |
| *Azospirillum brasilense* | $10 \cdot 10^8$ CFU/T |
| Polyamines and/or tyramine (from an algae or beet vinasse extract prepared according to example 1a), 1b) or 1c)) | 0.5 g/T |

Example 4c): Root Fertiliser

Table 16 below describes the composition of an NP-type root fertiliser.

TABLE 16

| Ingredients | Quantity of ingredients in kg |
|---|---|
| *Lithothamnium* | QS 1000 kg |
| Potassium chloride | 167 kg |
| Urea | 161 kg |
| Ammonium sulfate | 362 kg |
| *Pseudomonas* spp. | $\cdot 10^8$ CFU/T |
| Polyamines and/or tyramine (from an algae or beet vinasse extract prepared according to example 1a), 1b) or 1c)) | 10 g/T |

Table 17 below describes the composition of an NPK-type root fertiliser and magnesium oxide.

TABLE 17

| Ingredients | Quantity of ingredients in kg |
|---|---|
| *Lithothamnium* | QS 1000 kg |
| Ammonium phosphate | 116 kg |
| Ammonium sulfate | 186 kg |
| Urea | 156 kg |
| Magnesium oxide | 50 kg |
| Potassium chloride | 334 kg |
| Plant Growth Promoting Rhizobacteria | $5 \cdot 10^8$ CFU/T |
| Polyamines and/or tyramine (from an algae or beet vinasse extract prepared according to example 1a), 1b) or 1c)) | 5 g/T |

Example 4 d): Root Nutrient Solutions

Table 18 below describes the composition of an NPK-type solution and magnesium.

TABLE 18

| Ingredients | Quantity of ingredients in L |
|---|---|
| Potassium nitrate | QS 1 L |
| Potassium phosphate | 27 g/L |
| Magnesium sulfate | 49 g/L |
| Plant Growth Promoting Rhizobacteria | $1 \cdot 10^8$ CFU/T |
| Polyamines and/or tyramine (from an algae or beet vinasse extract prepared according to example 1a), 1b) or 1c)) | 10 mg/L |

Table 19 below describes the composition of N, calcium and magnesium solution.

TABLE 19

| Ingredients | Quantity of ingredients in L |
|---|---|
| Calcium nitrate | QS 1 L |
| Iron chelate | 5 g/L |
| *Bacillus licheniformis* | $5 \cdot 10^8$ CFU/T |
| Polyamines and/or tyramine (from an algae or beet vinasse extract prepared according to example 1a), 1b) or 1c)) | 0.5 mg/L |

Example 4e): Compositions Intended for Animal Feed

Table 20 below describes the composition of a probiotic.

TABLE 20

| Ingredients | Quantity of ingredients in g |
|---|---|
| Nutritional yeasts | QS 1000 g |
| *Lithothamnium* | 500 g |
| Sodium bicarbonate | 200 g |
| Magnesium oxide | 100 g |
| *Bacillus subtilis* or *B. amyloliquefaciens* | $5 \cdot 10^8$ CFU/kg |
| Polyamines and/or tyramine (from an algae or beet vinasse extract prepared according to example 1a), 1b) or 1c)) | 0.5 mg/T |

Table 21 below describes the composition of a silage preservative.

TABLE 21

| Ingredients | Quantity of ingredients in g |
|---|---|
| Lactose | QS 100 g |
| Xylanase enzyme (in International units/g) | >1500 IU/g |
| Beta-glucanase enzyme (in International units/g) | >1500 IU/g |
| *Lactobacillus plantarum* | $2.5 \cdot 10^{11}$ CFU/100 g |
| Polyamines and/or tyramine (from an algae or beet vinasse extract prepared according to example 1a), 1b) or 1c)) | 0.5 mg/100 g |

BIBLIOGRAPHY

[1] "*Polyamines in Ecklonia maxima and their effects on plant growth*", Heino Benoni Papenfus, the Research Centre for Plant Growth and Development School of Biological and Conservation Sciences, University of KwaZulu-Natal Pietermaritzburg, December 2011.

[2] «*Vinasse de mélasse de betterave*», Sheet no. 10 of the Comité National des Coproduits.

[3] «*La vinasse of mélasse of betteraves pour les ruminants*», INRA Prod. Anim., 1989, 2 (4), 245-248, J. L. TROCCON, C. DEMARQUILLY.

The invention claimed is:

1. Method for stabilizing microorganisms under an environmental stress by contacting said microorganisms with an algae and/or plant extract, said extract containing polyamines and/or tyramine, wherein the algae and/or plant extract is an extract of brown algae of the Fucaceae family and/or an extract of beet molasses vinasse.

2. Method according to claim 1, wherein the microorganisms are contained in a fertilising composition, a composition intended for animal feed, or a composition intended for the preservation of silage.

3. Method according to claim 2, wherein said composition further comprises a fertiliser and/or a soil amendment.

4. Method according to claim 2, wherein the microorganisms are contained in the composition in a quantity ranging from $10^2$ to $10^{50}$ CFU per tonne of composition.

5. Method according to claim 1, wherein the microorganisms are chosen from (i) atmospheric nitrogen fixing bacteria, (ii) plant growth promoting Rhizobacteria (PGPR), (iii) phosphorus-solubilising bacteria, (iv) root phytoprotectant bacteria (PGPR) capable of opposing the activity of pathogens, (v) phytohormone producing bacteria, (vi) bacteria involved in the process of mineralisation of organic matter, (vii) iron-solubilising bacteria, (viii) silica-solubilising bacteria, (ix) sulfur-oxidising bacteria, (x) lactic acid bacteria, (xi) bacteria of the genus *Enterococcus* spp., (xii) bacteria of the genus *Pediococcus* spp., (xiii) bacteria of the genus *Bacillus licheniformis*, (xiv) mycorrhizal fungi, (xv) yeasts of the genus *Saccharomyces cerevisiae*, and (xvi) a mixture of at least two microorganisms chosen from (i) to (xv).

6. Method according to claim 1, wherein the polyamines are chosen from cadaverine, spermidine, spermine and/or putrescine.

7. Method according to claim 1, wherein the microorganisms are chosen from (i) an atmospheric nitrogen fixing bacteria which is *Azotobacter* or *Azospirillum*, (ii) an phosphorus-solubilising bacteria which is *Bacillus amyloliquefaciens*, (iii) an root phytoprotectant bacteria (PGPR) capable of opposing the activity of pathogens which is *Bacillus subtilis* or *Pseudomonas* spp., (iv) an phytohormone producing bacteria which is *Bacillus amyloliquefaciens* or *Bacillus radicola*, (v) a bacteria involved in the process of mineralisation of organic matter which is *Lactobacillus rhamnosus* or *Lactobacillus faciminis*, (vi) an iron-solubilising bacteria which is *Pseudomonas* spp., (vii) a lactic acid bacteria which is *Lactobacillus* spp., *Lactococcus* spp., or *Bifidobacterium* spp., (viii) a mycorrhizal fungi which is *Rhizophagus irregularis*, (ix) a mixture of at least two microorganisms chosen from (i) to (viii).

8. Method according to claim 1, wherein the algae and/or plant extract is an extract of *Fucus vesiculosus*, an extract of *Ascophyllum nodosum* and/or an extract of beet molasses vinasse.

9. Method according to claim 1, wherein the algae and/or plant extract contains at least 0.01% by mass of polyamines and/or tyramine relative to the total dry mass of the extract (% wt/wt).

10. Composition comprising:

(a) an algae and/or plant extract, said extract containing polyamines and/or tyramine, wherein the algae and/or plant extract is an extract of brown algae of the Fucaceae family and/or an extract of beet molasses vinasse, and (b) microorganisms chosen from: (i) atmospheric nitrogen fixing bacteria, (ii) plant growth promoting Rhizobacteria (PGPR), (iii) phosphorus-solubilising bacteria, (iv) root phytoprotectant bacteria (PGPR) capable of opposing the activity of pathogens, (v) phytohormone producing bacteria, (vi) bacteria involved in the process of mineralisation of organic matter, (vii) iron-solubilising bacteria, (viii) silica-solubilising bacteria, (ix) sulfur-oxidising bacteria, (x) lactic acid bacteria, (xi) bacteria of the genus *Enterococcus* spp., (xii) bacteria of the genus *Pediococcus* spp., (xiii) bacteria of the genus *Bacillus licheniformis*; (xiv) mycorrhizal fungi, (xv) yeasts of the genus *Saccharomyces cerevisiae*, and (xvi) a mixture of at least two microorganisms chosen from (i) to (xv).

11. Composition according to claim 10, comprising $10^2$ to $10^{50}$ CFU of microorganisms (b) per tonne of composition.

12. Composition according to claim 10, comprising 0.1 to 100 grams of polyamines and/or tyramine (a) per tonne of composition (g/T).

13. Composition according to claim 10, further comprising (c) a fertiliser and/or a soil amendment.

14. Composition according to claim 10, wherein the polyamines are chosen from tyramine, cadaverine, spermidine, spermine and/or putrescine.

15. Composition according to claim 10, wherein the microorganisms are chosen from (i) an atmospheric nitrogen fixing bacteria which is *Azotobacter* or *Azospirillum*, (ii) an phosphorus-solubilising bacteria which is *Bacillus amyloliquefaciens*, (iii) an root phytoprotectant bacteria (PGPR) capable of opposing the activity of pathogens which is *Bacillus subtilis* or *Pseudomonas* spp., (iv) an phytohormone producing bacteria which is *Bacillus amyloliquefaciens* or *Bacillus radicola*, (v) a bacteria involved in the process of mineralisation of organic matter which is *Lactobacillus rhamnosus* or *Lactobacillus* faciminis, (vi) an iron-solubilising bacteria which is *Pseudomonas* spp., (vii) a lactic acid bacteria which is *Lactobacillus* spp., *Lactococcus* spp., or *Bifidobacterium* spp., (viii) a mycorrhizal fungi which is *Rhizophagus irregularis*, (ix) a mixture of at least two microorganisms chosen from (i) to (viii).

16. Method according to claim 10, wherein the algae and/or plant extract is an extract of *Fucus vesiculosus*, an extract of *Ascophyllum nodosum* and/or an extract of beet molasses vinasse.

17. Method according to claim 10, wherein the algae and/or plant extract contains at least 0.01% by mass of polyamines and/or tyramine relative to the total dry mass of the extract (% wt/wt).

18. Method for fertilising a plant, characterised in that it comprises the application, to said plant, of a composition according to claim 10.

19. Method according to claim 18, wherein the composition is applied to said plant in a quantity ranging from 0.5 to 1500 kg/ha.

* * * * *